United States Patent [19]

Tabuchi

[11] Patent Number: 4,967,285

[45] Date of Patent: Oct. 30, 1990

[54] METHOD OF COMPENSATING FOR BACKLASH CAUSED AFTER CUTTING OFF RECORDING PAPER ON FACSIMILE APPARATUS

[75] Inventor: Hiroshi Tabuchi, Hyogo, Japan

[73] Assignee: Mitsubishi Denki Kabushiki Kaisha, Tokyo, Japan

[21] Appl. No.: 434,001

[22] Filed: Nov. 9, 1989

[30] Foreign Application Priority Data

Dec. 5, 1988 [JP] Japan ................................ 63-307302

[51] Int. Cl.[5] ........................ H04N 1/23; B23D 25/00; B26D 5/00; B23Q 15/00

[52] U.S. Cl. ...................................... 358/304; 346/24; 83/37; 83/72

[58] Field of Search .............. 358/304; 346/24; 83/37, 83/38, 72

[56] References Cited

U.S. PATENT DOCUMENTS 4,122,497 10/1978 Suzuki ................................ 358/304

*Primary Examiner*—George H. Miller, Jr.
*Assistant Examiner*—Scott A. Rogers
*Attorney, Agent, or Firm*—Bernard, Rothwell & Brown

[57] ABSTRACT

A method of cutting off recording paper on a facsimile apparatus is disclosed in which the recording paper wound as a roll is sequentially fed through the apparatus so that the paper is cut off by a cutter after the recording on each sheet area of the paper is performed. The method comprises a stop in which the torque of an electric motor is transmitted to a platen roller through a gear train so that the recording on the (n+1) th-sheet area of the recording paper is performed continuously after the recording on the nth-sheet area of the paper; a step in which when the boundary between the nth-sheet area and the (n+1)th-sheet area has reached the cutoff position, the recording on the (n+1)th-sheet area is temporarily stopped and the backlash of the gear train is compensated for by rotating the motor backward; a step in which the recording paper is cut off by the cutter; and a step in which the backlash of the gear train is compensated for again by rotating the motor forward. As a result, although the recording paper is cut off by the cutter while recording on the (n+1)th-sheet area, the recorded image on the (n+1)th-sheet area does not have blank spaces or overlapped recording. In addition, the time of communication to the facsimile apparatus through a telephone line is shortened to reduce the cost of the communication.

5 Claims, 10 Drawing Sheets

METHOD OF COMPENSATING FOR BACKLASH CAUSED AFTER CUTTING OFF RECORDING PAPER ON FACSIMILE APPARATUS

BACKGROUND OF THE INVENTION

1. Field of the Invention

The present invention relates to a method in which recording paper such as thermosensitive recording paper wound on a roll is cut off by a cutter after recording is performed on a one-sheet area of the paper.

2. Description of the Prior Art

In FIG. 1, numeral 1 denotes a roll-wound thermosensitive recording paper provided in a prescribed housing portion and platen roller 2 is for feeding the recording paper. Thermosensitive head 3 has a heating portion 3*a* in the face of the platen roller and is put in contact with the roller under prescribed pressure so as to record information on the recording paper. Electric motor 4 has gear train 5 comprising gears 5*a*, 5*b*, 5*c* and 5*d* to transmit the torque of the motor 4 to the platen roller to rotate it at a lower speed than the motor. Cutter 6 is for cutting off the recording paper after the information is recorded on one-sheet of paper.

The operation of the conventional facsimile apparatus will be described with reference to FIG. 1, FIG. 2 which is a time chart, and FIG. 3 which is a flow chart. In FIG. 2, (A) designates the timing of the recording by the thermosensitive head 3, (B) designates the operation of the motor 4, and (C) designates the operation of the cutter 6. In FIG. 2, S denotes the time which it takes for the recording paper 1 to move through the distance D (which is shown in FIG. 1) from the heating portion 3*a* of the thermosensitive head 3 to the cutter 6. Period E represents the time of the operation of the cutter, and F represents the time of the stoppage of the recording by the head 3. When the motor 4 is rotated forward in a direction G shown in FIG. 1 (in FIG. 2 shown as FORWARD), the platen roller 2 is turned in a direction H through the gear train 5 so that the recording paper 1 is fed in a direction I. At the same time, the thermosensitive head 3 is turned on so that information is recorded on the nth-sheet area of the paper 1. The paper is then fast fed forward by the distance D (in FIG. 3, shown as F—F) for a portion of the time F so that the trailing edge of the nth-sheet area of the paper is stopped at the cutter 6. After the stoppage of the motor 4 is confirmed, the cutter 6 is put into operation to cut off the recording paper 1. Subsequently, the motor 4 is rotated backward in a direction J (in FIG. 2, shown as REVERSE) so that the platen roller 2 is turned in a direction K through the gear train 5 so that the recording paper is pulled back by the distance D in the direction L. The motor 4 is then set to rotate forward in the direction G so that the recording paper 1 is fed in the direction I. At the same time, the thermosensitive head 3 is turned on so that information is recorded on the (n+1)th-sheet area of the recording paper 1. The time F of the stoppage of the recording, as illustrated in FIG. 2, is expressed as follows:

$$F=S+E+S \quad (1)$$

The conventional operation of the thermosensitive head 3, the motor 4, the cutter 6 and the other interacting elements is regulated, for the sequence shown in FIG. 2, by a control circuit including a microcomputer or the like not shown in the drawings. FIG. 3 is a flow chart illustrating the steps of the conventional paper cutting method as described above.

FIG. 4 is a side view of a major part of another conventional facsimile apparatus. In FIG. 4, numerals 7*a* and 7*b* designate timing pulleys, and 8 is a timing belt for rotating a platen roller 2 through the timing pulleys 7*a* and 7*b* by the rotation of a motor 4. Except the platen roller drive mechanism of the apparatus, the arrangement of FIG. 4 is the same as that shown in FIG. 1.

The operation of the apparatus shown in FIG. 4 will be described with reference to FIG. 5 which is a time chart. In FIG. 5, T denotes the time of the stoppage of recording by thermosensitive head 3. When the motor 4 is rotated forward in a direction V shown in FIG. 4, (in FIG. 5, shown as FORWARD) the platen roller 2 is rotated in a direction H through the timing pulleys 7*a* and 7*b* and the timing belt 8 so that thermosensitive recording paper 1 wound on a roller is fed in a direction I. At the same time, the thermosensitive head 3 is turned on so that information is recorded on the nth-sheet area of the paper 1. After the information is recorded on the nth-sheet area of the paper 1, the recording of information on the (n+1) th-sheet area of the paper is started. As the recording of the information on the (n+1)th-sheet area of the paper 1 continues, the nth-sheet of paper 1 moves forward by the distance D from the heating portion 3*a* of a thermosensitive head 3 to a cutter 6. The motor 4 is stopped as well as recording on the (n+1)th-sheet. The cutter 6 is thereafter put into operation to cut off the recording paper 1. The thermosensitive head 3 is then turned on so that the recording of the information on the (n+1)th-sheet area of the recording paper 1 is resumed. The time T of the stoppage of the recording, as illustrated in FIG. 5, is expressed as follows:

$$T=E \quad (2)$$

In the facsimile apparatus as shown in FIG. 1, the recording on the (n+1)th-sheet area of the recording paper 1 is started after the completion of the recording on the nth-sheet area, and after the nth-sheet area is cutoff. This procedure is to insure that the recorded image on the (n+1)th-sheet area of the paper is not disturbed due to the backlash of the gear train 5. Backlash of the gear train results from the paper being pulled forward in direction I by the cutting action of cutter 6. When recording resumes, the motor 4 moves gear 5*c* a distance, equal to the amount gear 5*d* was rotated forward, before engaging gear 5*d* and advancing the paper. This distance is equal to the distance between the teeth of gears 5*d* and 5*c*. The time required to move this distance results in blank spaces or overlapping recordings on the (n+1)th-sheet. For that reason, the trailing edge of the nth-sheet area of the recording paper is once quickly moved to the cutter 6, and cut off thereby. The leading edge of the (n+1)th-sheet area of the paper is then moved back toward the thermosensitive head 3, as shown in FIG. 2. Fast feeding, stopping and reversing paper 1 results in lengthening the time from the end of the recording on the nth-sheet area of the paper 1 to the start of the recording of the (n+1)th-sheet area. Therefore, it takes a long time to perform communication to the facsimile apparatus through a telephone line. High communication costs result from this problematic method of cutting off a recorded area of paper 1.

In the conventional facsimile apparatus shown in FIG. 4, since the torque of a gear is transmitted to the platen roller 2 through the timing pulleys 7*a* and 7*b* and timing belt 8, the recorded image on the (n+1)th-sheet area of the recording paper 1 is not disturbed by backlash. For that reason, the time from the end of the recording on the nth-sheet area of the recording paper 1 to the start of the recording on the (n+1)th-sheet area thereof is shorter, as shown in FIG. 5. Therefore, it takes a shorter time to perform communication to the facsimile apparatus of FIG. 4 through a telephone line. However, since the tension of the timing belt needs to be adjusted in installing the electric motor, the facsimile apparatus of the type shown in FIG. 4 has a problem in that the efficiency of its manufacturing is low.

SUMMARY OF THE INVENTION

The present invention is directed toward solving the above-mentioned problems:

Accordingly, it is an object of the present invention to provide a recording paper cutoff method for a facsimile apparatus, in which the time from the end of recording on the nth-sheet of recording paper to the start of recording on the (n+1)th-sheet area thereof is shortened to reduce the cost of communication with the apparatus through a telephone line.

It is another object of the present invention to provide a recording paper cutoff method for a facsimile apparatus, in which, although the recording on the (n+1)th-sheet area of recording paper is started continuously from the end of recording on the nth-sheet area and temporarily stopped in order to cut off the nth-sheet area from the (n+1)th-sheet area, the recorded image on the (n+1)th-sheet area is not disturbed when the recording on the area is resumed after the temporary stoppage.

It is yet another object of the present invention to provide a recording paper cutoff method for a facsimile apparatus, in which the total time of communication with the apparatus is shortened in a simple and less expensive manner.

The above-mentioned and other objects and novel features of the present invention will be apparent from the description herein and the drawings attached hereto. The drawings are only for purposes of description, and not for limiting the scope of the present invention.

In order to accomplish the above-described objects, the recording paper cutoff method according to one embodiment of the invention comprises a step in which the torque of an electric motor is transmitted to a platen roller through a gear train so that the recording on the (n+1)th-sheet area of the recording paper wound as a roll is performed continuously from the end of recording on the nth-sheet area thereof; another step in which the boundary between the nth-sheet area and the (n+1)th-sheet area has reached the position of a cutter, the recording on the (n+1)th-sheet area is temporarily stopped and the backlash of the gear train is compensated for by rotating the motor backward; another step in which the recording paper is cut off by the cutter; another step in which the backlash of the gear train is compensated for once again by rotating the motor forward after the cutoff of the paper by the cutter; and a further step in which the recording on the (n+1)th-sheet area is resumed.

In the recording paper cutoff method of the aforementioned embodiment, the backlash of the gear train is compensated for by the backward and forward rotation of the motor immediately before and after the cutoff of the recording paper by the cutter so that the recording paper is prevented from being disturbed at the time of the cutoff by the cutter and at the time of the resumption of the recording on each sheet area of the paper. In other words, the recording paper is not disturbed although a previously recorded paper is cut off by the cutter while recording on a subsequent sheet area of the paper is stopped and resumed. As a result, the recorded image on each sheet area of the recording paper does not have blank spaces or overlapped recordings. In addition, the time of communication to the facsimile apparatus through the telephone lines is shortened to reduce the cost of the communication.

DETAILED DESCRIPTION OF THE PREFERRED EMBODIMENTS

Referring now to the accompanying drawings, the preferred embodiments of the present invention will be described in detail.

Figure 6:
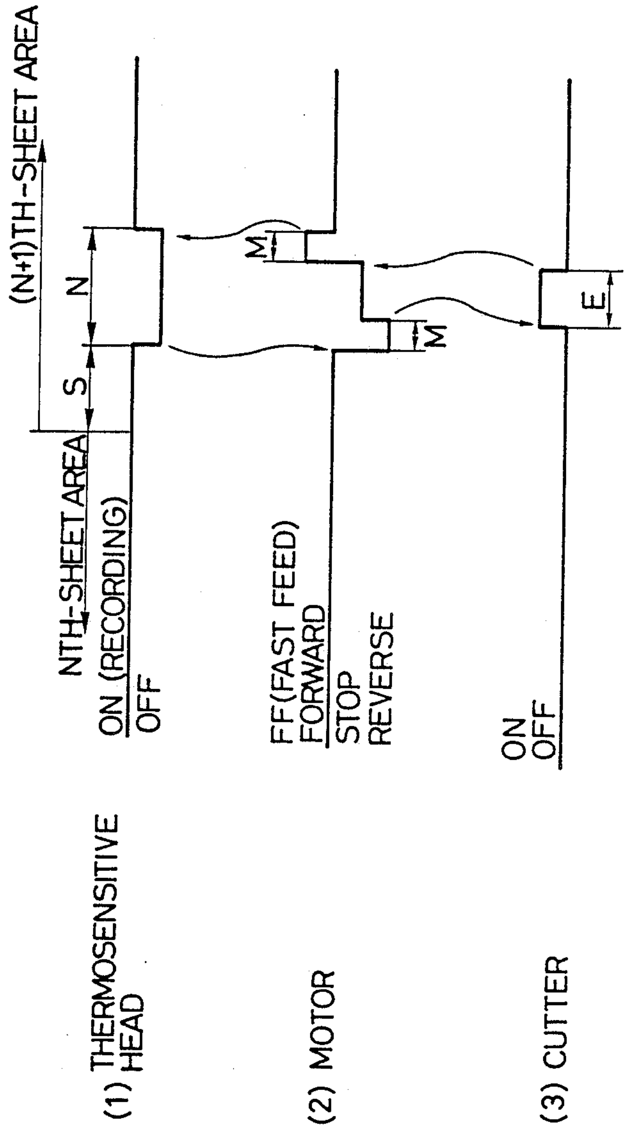
FIG. 6 is a time chart of a recording paper cutoff method which is the present invention.
Figure 7:
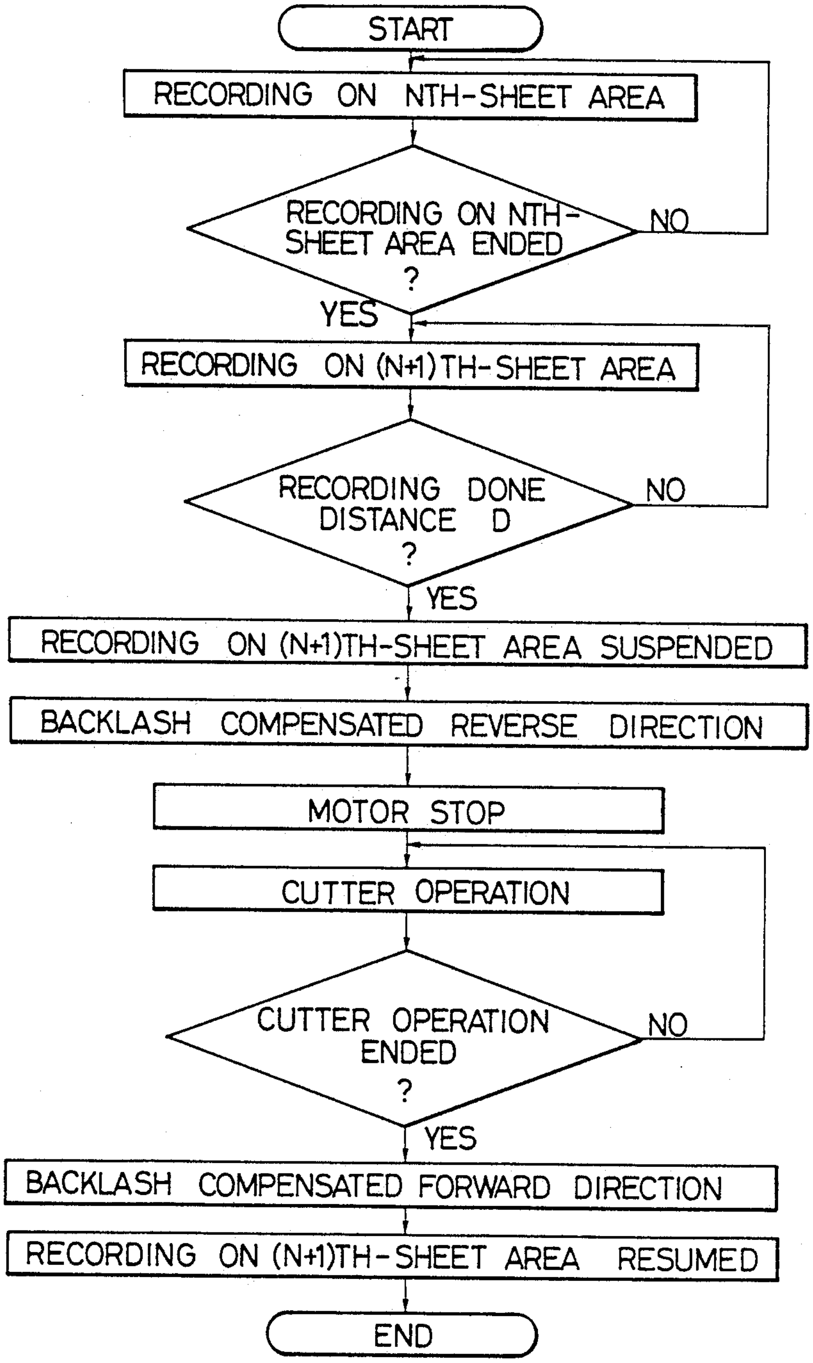
FIG. 7 is a flow chart of the recording paper cutoff method of the embodiment shown in FIG. 6.

FIG. 6 is a time chart of a recording paper cutoff method which is one embodiment of this invention. FIG. 7 is a flow chart of the method of this embodiment. The method of the present invention is applied to a facsimile apparatus shown in FIG. 8 which is substantially the same as the facsimile apparatus shown in FIG. 1. Facsimile apparatus 10 additionally comprises a suitable control unit 7 which utilizes a microcomputer for regulating the electric motor 14, the cutter 16 and the other related elements to implement the method of this invention.

Figure 1:
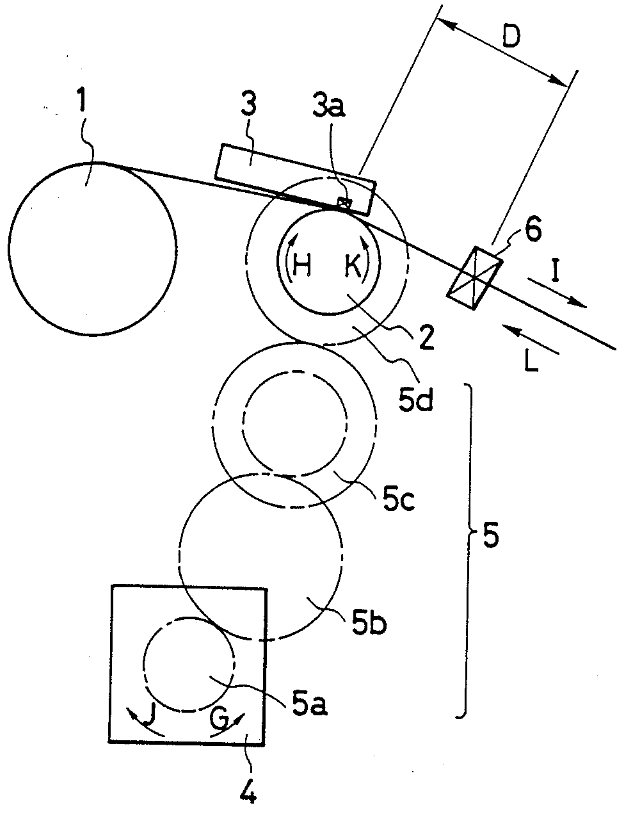
FIG.1 (PRIOR ART)
FIG. 1 is a side view of a facsimile apparatus which utilizes a conventional recording paper cutoff method.
Figure 2:
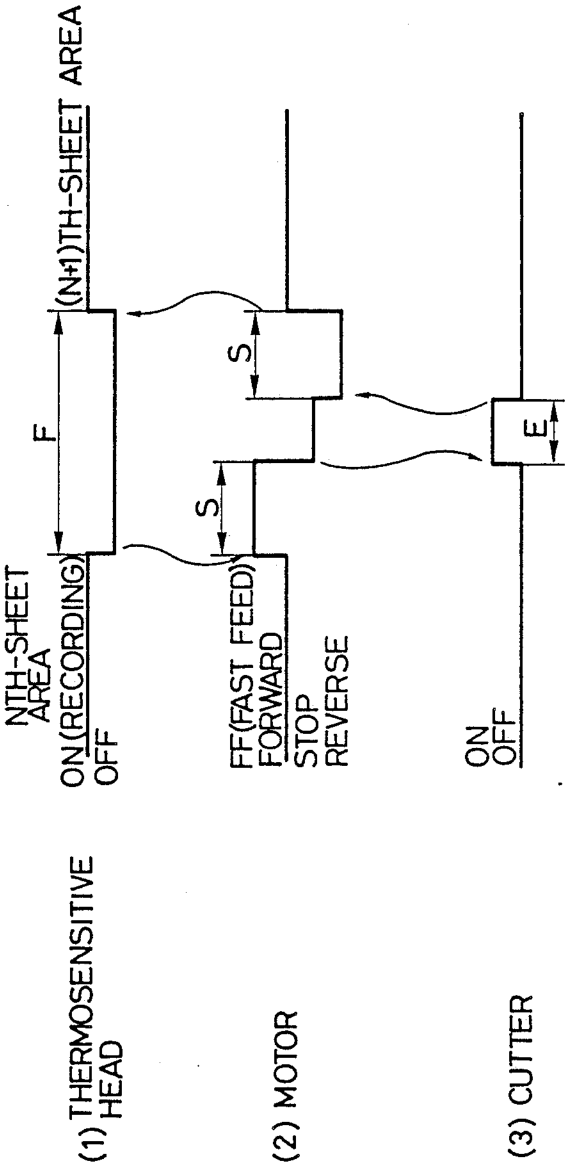
FIG.2 (PRIOR ART)
FIG. 2 is a time chart of the conventional recording paper cutoff method.
Figure 3:
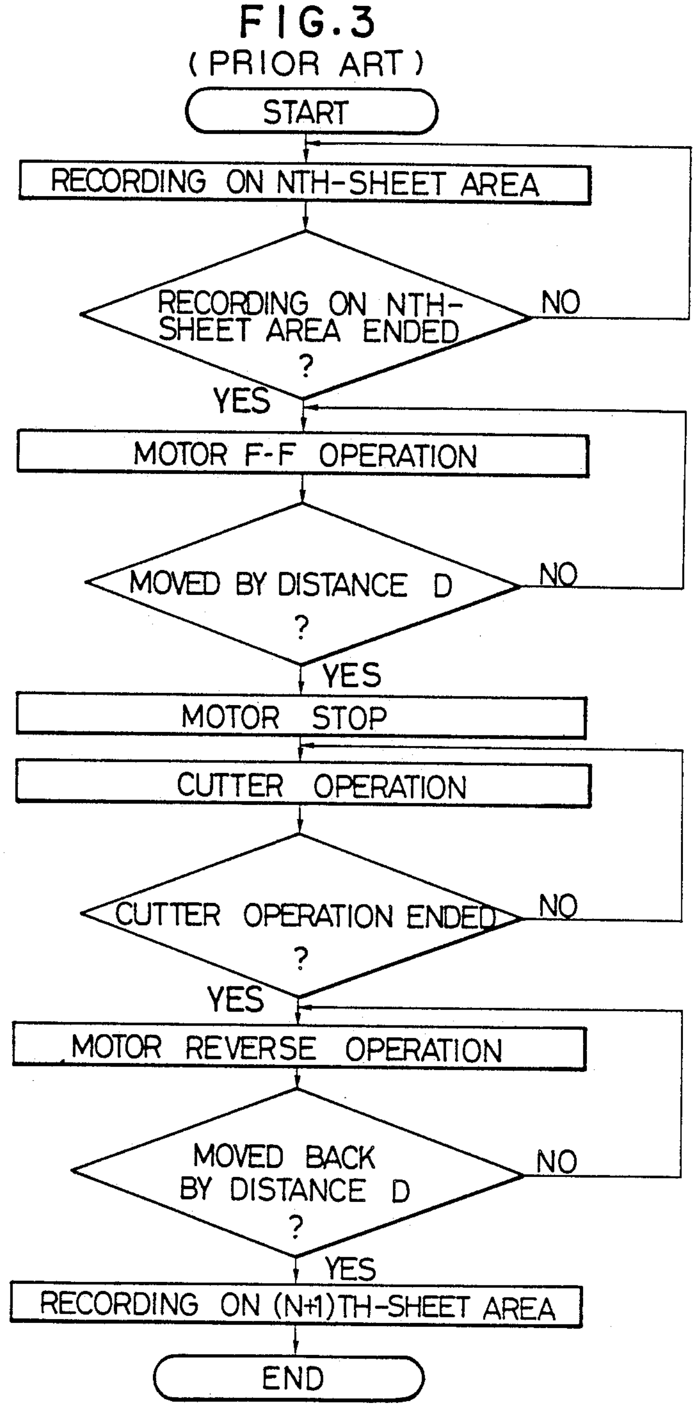
FIG.3 (PRIOR ART)
FIG. 3 is a flow chart of the conventional recording paper cutoff method.
Figure 4:
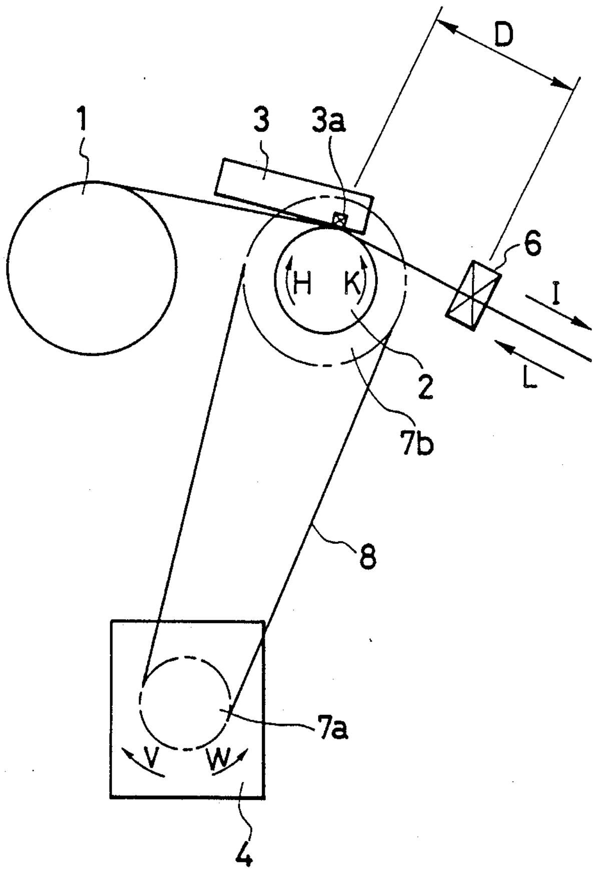
FIG. 4 (PRIOR ART)
FIG. 4 is a side view of a major part of another conventional facsimile apparatus in which another conventional recording paper cutoff method is practiced.
Figure 5:
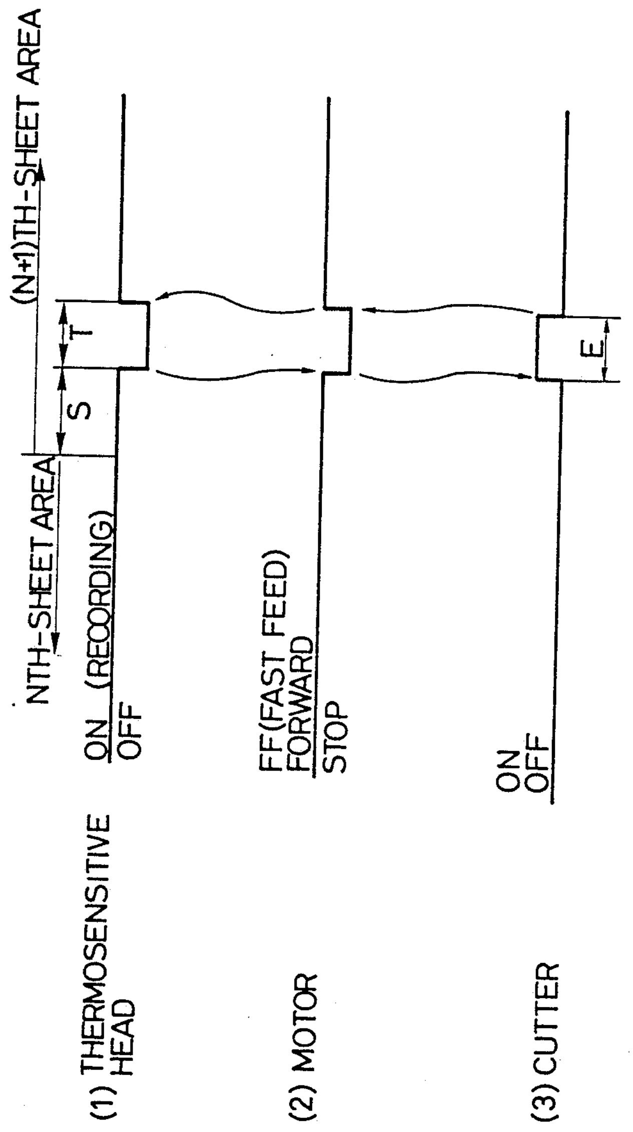
FIG. 5 (PRIOR ART)
FIG. 5 is a time chart of the conventional recording paper cutoff method shown in FIG. 4.

As illustrated in FIG. 6, after information is recorded on the nth-sheet area of thermosensitive recording paper 1 wound as a roll, the recording of information on the (n+1)th-sheet area of the paper is initiated immediately thereafter and continues until the recording on the nth-sheet area of the paper 11 reaches the distance D from the heating portion 3*a* to the cutter 16. Recording of the (n+1)th-sheet is then interrupted. The motor 4 is then rotated backward in a direction J, as shown in FIG. 1, for the short time M in order to compensate for the backlash of the gear train 15. The backlash compensation period M is typically about 10 msec. The cutter 16, is then put into operation to cut off the recording paper 11. Since the backlash of the gear train 15 is compensated for before the cutoff of the recording paper 11, the gear 15*c* engaged with gear 15*d* in the backward direction and the paper is not pulled in a direction I. After the paper 11 is cut off by the cutter 16, the motor 14 is quickly driven in a direction G for the short time M in order to compensate for the backlash of the gear train 15 again, thus engaging gears 15*c* and 15*d* in the forward direction. This enables the gear 15*c* to engage gear 15*d* immediately in the forward direction. The thermosensitive head 13 is then turned on so that the recording on the (n+1)th-sheet area of the paper 11 is resumed. The time N of the stoppage of the recording, as illustrated in FIG. 6, is expressed as follows:

$$N=M+E+M \quad (3)$$

Because backlash compensation time M is very small (about 10 msec. as noted above) compared to cutting time E, it can be ignored and the equation (3) is transformed into N=E, wherein E is approximately 1-2 sec. It is understood through the comparison of the equations (1) and (3), that the time of the recording stoppage is greatly shortened in the recording paper cutoff method in the embodiment described. In addition, it is to be understood that the time N of the stoppage of the recording is nearly equal to that of T expressed by the equation (2) above.

Figure 9:
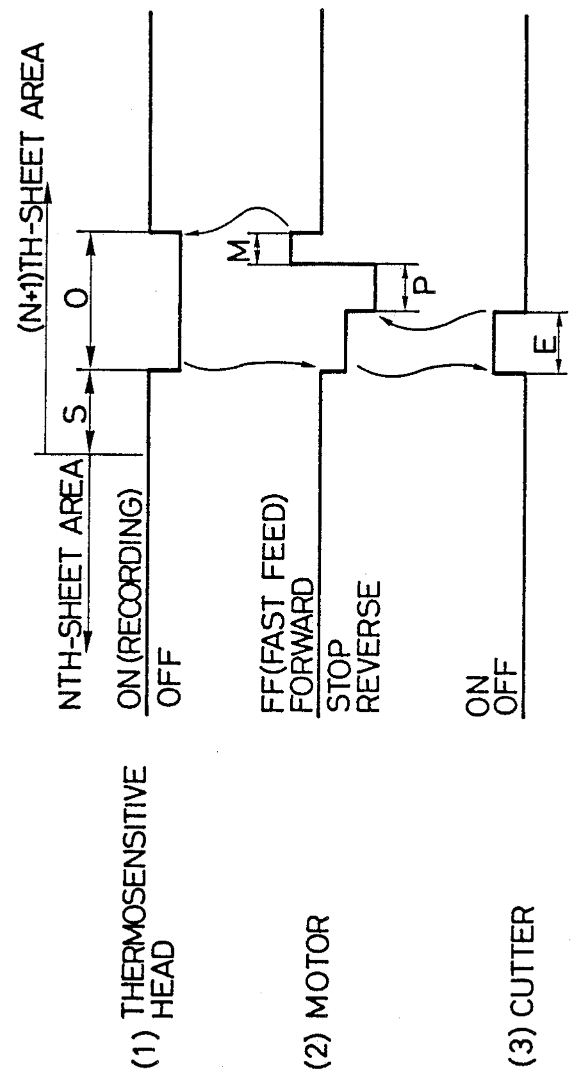
FIG. 9 is a time chart of a recording paper cutoff method which is another embodiment of the present invention.

In the above-described embodiment, the backlash of the gear train 15 is compensated for immediately before and after the cutting of the recording paper 11 by the cutter 16 so as to prevent the recorded image on the (n+1)th-sheet area of the paper from being disturbed. However, in a modification of the aforementioned embodiment, the backlash of the gear train 15 is compensated for only immediately after the cutoff of the thermosensitive recording paper 11 by the cutter 16. At that time, the electric motor 14 is rotated backward in the direction J for a short time P, typically about 10 msec., so that the paper is pulled back in a direction L. The recording on the (n+1)th-sheet area of the paper 11 is then resumed. As illustrated by the time chart in FIG. 9, the control unit 7 regulates the thermosensitive head to record information on the nth-sheet and then to immediately initiate recording information on the (n+1)th-sheet, as indicated by time period S. After the boundary between the nth-sheet and the (n+1)th-sheet travels distance D to cutter 16, recording is interrupted, the motor is stopped and cutting operation is initated, as indicated by time period E. The gear 15*d* is rotated backward by pulling the paper in the direction I, and then the motor is rotated forward a short time M to compensate for backlash of gear train 15.

In this embodiment, the backlash is not compensated for before cutting which will cause a small gap between printed lines on sheet (n+1). However, this is acceptable in most circumstances. The step of compensating gear train backlash after the paper has been cut is necessary however, in order to prevent recording lines on sheet (n+1) from being superimposed when recording is resumed.

Figure 8:
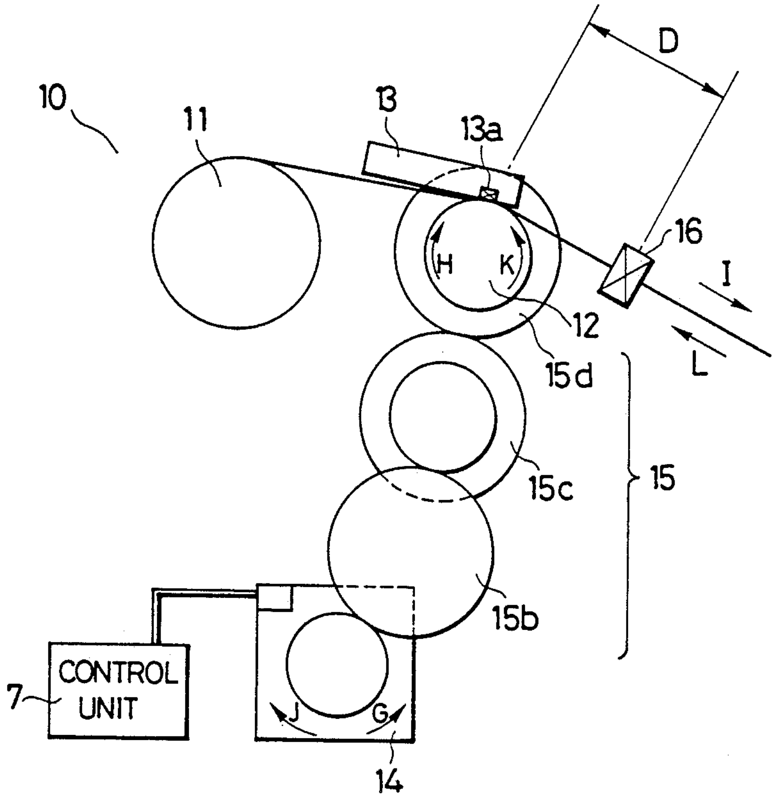
FIG. 8 is a side view of a facsimile apparatus using the novel control method for cutting off a sheet of recording paper according to the present invention.
Figure 10:
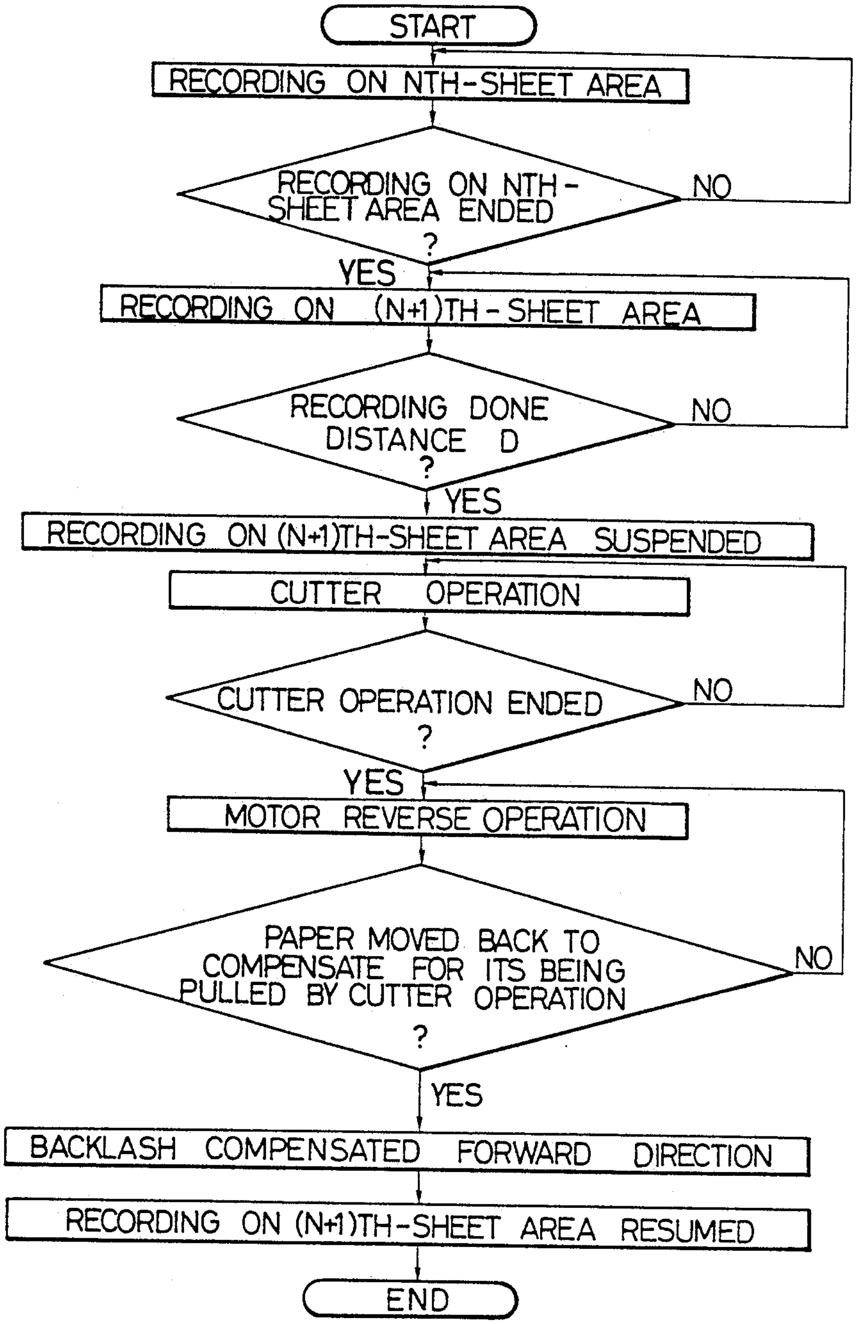
FIG. 10 is a flow chart of the recording paper cutoff method of the embodiment shown in FIG. 9.

FIG. 10 is a flow chart showing the manner in which control unit 7 regulates the FIG. 8 apparatus to compensate for gear train backlash only after the paper is pulled by the cutting operation. The time of the stoppage of the recording, period D, is greatly shortened in the modification as well as the above-described embodiment. Although thermosensitive paper wound on a roll is used in the above-described embodiment, the present invention is also applicable to plain paper wound on a roll which is to be subjected to recording by a recording head.

According to the present invention, the timing of the recording is regulated by the control unit 7 so that when the boundary between the nth-sheet area and (n+1)th-sheet area of the recording paper 11 has come to the location of the cutter 16 during the recording on the (n+1)th-sheet area, the recording on the (n+1)th-sheet area is temporarily stopped and the paper is cut off. The backlash of the gear train 15 is compensated for immediately before and/or after the cutoff of the recording paper 11, and the recording on the (n+1)th-sheet area is then resumed. As a result, the time of communication to the facsimile apparatus through a telephone line is shortened to reduce the cost of the communication, and each image recorded on the paper is protected from disturbance. In addition, the recording paper cutoff method can be practiced with the facsimile apparatus without altering its basic construction through which the platen roller 12 is driven by the gear train 15.

What is claimed:

1. A method of cutting off recording paper on a facsimile apparatus in which the torque of an electric motor is transmitted to a platen roller through a gear train so that said roller is rotated at a lower speed than said motor; a recording head, which is located in contact with said roller at one end of said head-under prescribed pressure and has a recording portion at said end in the face of said roller, records information on a portion of said paper wound as a roll; and said portion of said paper is thereafter cut off from the other portion thereof by a cutter, comprising the following steps:

a. transmitting the torque of said motor to said roller through said gear train so that the recording on an (n+1)th-sheet area of said paper is performed continuously after the recording on an nth-sheet area;
b. temporarily stopping said recording on said (n+1)th-sheet when the boundary between said nth-sheet area and said (n+1)th-sheet area has reached a cutoff position;
c. compensating for backlash of said gear train caused in the temporary stoppage step by rotating said motor backward;
d. cutting said nth-sheet area from said (n+1)th-sheet area by said cutter;
e. compensating for backlash of said gear train caused in the cutting step by rotating said motor forward; and
f. resuming said recording on said (n+1)th-sheet area synchronously with resuming rotation of said roller.

2. A method of cutting off recording paper on a facsimile apparatus in which the torque of an electric motor is transmitted to a platen roller through a gear train so that said roller is rotated at a lower speed than said motor; a recording head, which is located in contact with said roller at one end of said head under prescribed pressure and has a recording portion at said end in the face of said roller, records information on a portion of said paper; and said portion of said paper is thereafter cut off from the other portion thereof by a cutter, comprising the following steps:

a. transmitting the torque of said motor to said roller through said gear train so that the recording on an (n+1)th-sheet area of said paper is performed continuously after the recording on an nth-sheet area;

b. temporarily stopping said recording on said (n+1)th-sheet when the boundary between said nth-sheet area and said (n+1)th-sheet area has reached a cutoff position;

c cutting off said nth-sheet area by said cutter as soon as the temporary stoppage is confirmed;

d. offsetting a rotation of said roller, which corresponds to the backlash of said gear train caused by said cutoff, by rotating said motor backward; and e. resuming said recording on said (n+1)th-sheet area synchronously with resuming rotation of said roller.

3. The method of cutting off recording paper on a facsimile apparatus as defined in claim 2, further comprising the step of rotating the motor forward to compensate for backlash of the gear train after said offsetting the rotation of said roller.

4. A method of cutting off recording paper on a recording apparatus comprising the following steps:

a. moving said paper through said recording apparatus with a motor driven gear train;

b. recording information on an (n+1) th-sheet area of said paper continuously after said recording on an nth-sheet area; and c. cutting off said nth-sheet area; and d. moving said gear train in a direction to remove backlash created by the paper cutting after said paper cutting.

5. The method of cutting off recording paper on a recording apparatus as defined in claim 4, further comprising the step of rotating said gear train forward to compensate for backlash of the gear train after removing backlash created by said paper cutting.

* * * * *